United States Patent [19]

Clark

[11] 3,730,552
[45] May 1, 1973

[54] LOAD ANCHORING DEVICE
[76] Inventor: Russell C. Clark, R.F.D. No. 1, Higganum, Conn. 06441
[22] Filed: Dec. 23, 1971
[21] Appl. No.: 211,317

[52] U.S. Cl. ...........................280/179 R, 248/361 R
[51] Int. Cl. ...............................................B60p 7/00
[58] Field of Search ..............................280/179 R; 248/361 R, 119 R; 292/288; 105/369 R

[56] References Cited

UNITED STATES PATENTS

| | | | |
|---|---|---|---|
| 1,780,277 | 11/1930 | Seeley | 280/179 R |
| 1,780,317 | 11/1930 | Snyder | 280/179 R |
| 2,901,267 | 8/1959 | Holsclan | 280/179 R |
| 3,420,489 | 1/1969 | Doggett | 248/361 R |
| 2,828,023 | 3/1958 | Berra | 248/119 R |

Primary Examiner—Kenneth H. Betts
Assistant Examiner—Robert R. Song
Attorney—David S. Fishman et al.

[57] ABSTRACT

Apparatus for anchoring a load to the platform of a transporting mechanism including hinge means having its base affixed to the platform and having a backplate which may be pivoted into load engaging position perpendicular to the platform surface. The hinge means backplate is provided with a series of slots and a spring loaded pin oriented transversely thereto in a bore which intersects the slots whereby an apertured flange extending from a load may be passed through a backplate slot located at the appropriate elevation and the flange aperture will be engaged by the pin.

14 Claims, 6 Drawing Figures

PATENTED MAY 1 1973                                    3,730,552
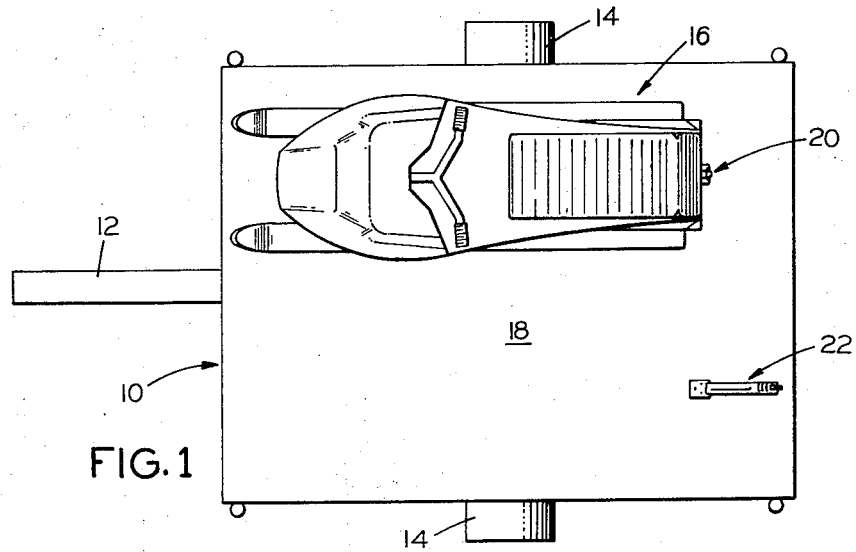
FIG.1
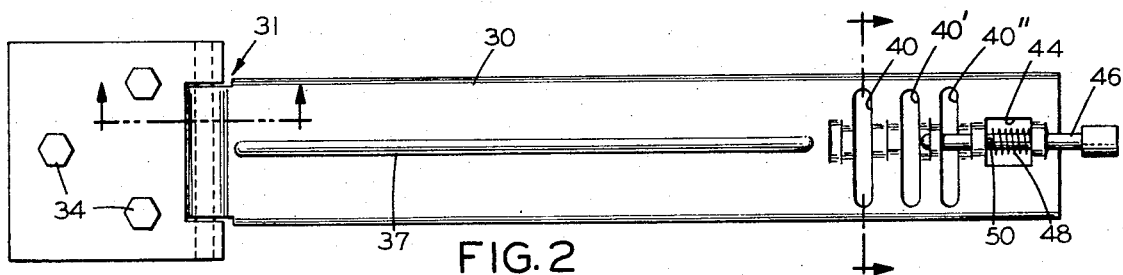
FIG.2
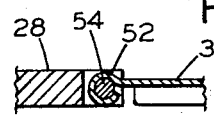
FIG.6
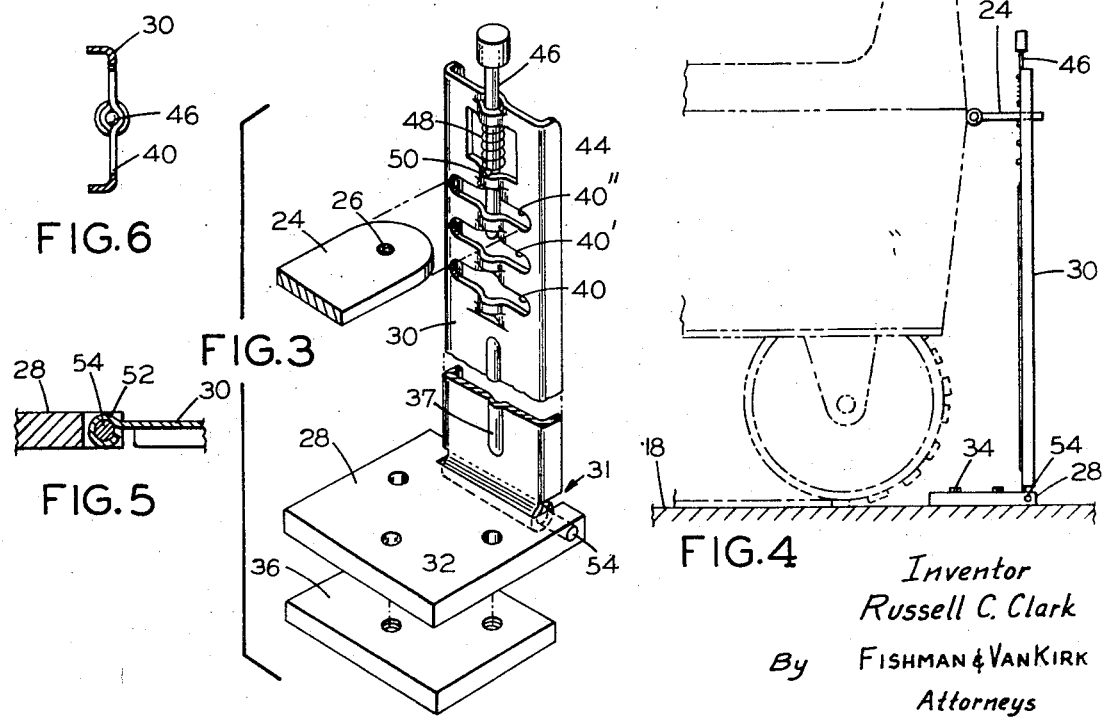
FIG.3
FIG.5
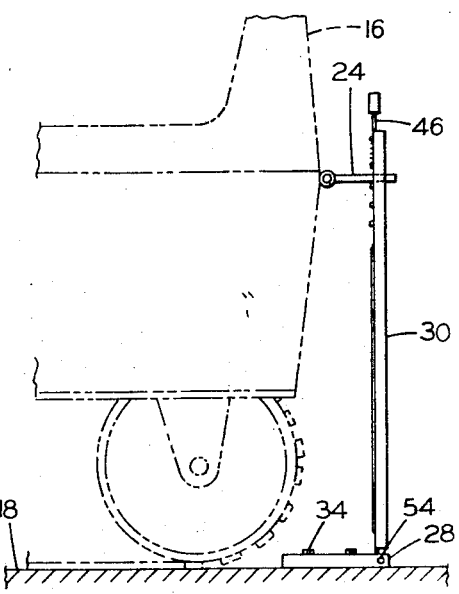
FIG.4
Inventor
Russell C. Clark
By  Fishman & VanKirk
Attorneys

LOAD ANCHORING DEVICE

BACKGROUND OF THE INVENTION

1. Field of the Invention

The present invention relates to the anchoring of loads to platforms which are employed to transport such loads from location to location. More specifically, this invention is directed to anchoring devices for securing loads in position on flat bed type trailers. Accordingly, the general objects of the present invention are to provide novel and improved methods and apparatus of such character.

2. Description of the Prior Art

While not limited thereto in its utility, the present invention has been found to be particularly well suited for the anchoring of vehicles to the beds of trailers employed in transporting of such loads. For reasons which are abundantly obvious, it is necessary to securely anchor such vehicular loads to the trailer platform during transit. The anchoring mechanism must be sturdy, reliable and, since it may often be necessary to operate the mechanism under adverse weather conditions, easy to use. In addition, the anchoring mechanism should be capable of being repositioned between the load engaging state and a state where it will not interfere with on and off loading of the trailer.

A number of prior art devices have been proposed for use in the anchoring of loads to movable platforms. These prior art devices have, however, been characterized by rather complex operation which contributed to difficulties in use, expense and a possibility of their becoming inoperative due to dirt or ice contamination. In addition, none of the previously available devices have been characterized by ease of attachment to the load transporting platform and accordingly have been available only as original equipment. There are, of course, many flat bed type trailers in use which have been either homemade by sportsmen or purchased for purposes other than transporting expensive equipment long distances and these trailers are lacking in anchoring devices which permit simple, quick and positive load tie-down.

SUMMARY OF THE INVENTION:

The present invention overcomes the above briefly discussed and other disadvantages and deficiencies of the prior art by providing a novel device for anchoring a load to a transporting platform. The invention comprises a hinged member having its base plate element adapted to be permanently and securely affixed to the upper surface of the transporting platform. If deemed necessary or desirable, a backing plate may be employed beneath the platform to provide added strength. The pivotal element of the hinged member is adapted to lie flat against the surface of the platform when not in use and is pivoted to an upright, load engaging position when in use. The pivotal element may be provided with one or a plurality of slots which receive an apertured bracket extending from the load. The pivotal load engaging element is also provided with a longitudinal bore which intersects the slot or slots. Anchoring of the load is achieved by inserting the apertured bracket through the slot located at the appropriate level and thereafter inserting a locking pin into the longitudinal bore so as to pass through the aperture in the load bracket. In a preferred embodiment, the locking pin is spring loaded and is permanently affixed to the pivotal element of the hinge member.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a top view of a flat bed trailer provided with two anchoring devices manufactured in accordance with the present invention, one of the anchoring devices being shown in the operative position and the other device being in the inoperative position;

FIG. 2 is a top view of a first embodiment of the present invention depicted in the inoperative or storage position;

FIG. 3 is a perspective view of the anchoring device of FIG. 2 in the operative or load engaging position;

FIG. 4 is a side elevation view of the embodiment of FIG. 2 in the load engaging position;

FIG. 5 is a side elevation view, taken along line 5—5 of FIG. 2, showing the hinge mechanism of the disclosed embodiment; and FIG. 6 is a cross-sectional view, taken along line 6—6 of FIG. 2.

DESCRIPTION OF THE PREFERRED EMBODIMENT:

With reference now to the drawing, and particularly to FIG. 1, a flat bed trailer is indicated generally at 10. Trailer 10 is provided with a tongue 12 for towing and a pair of wheels 14—14; the trailer being pivotable about the axle which interconnects wheels 14. As shown in FIG. 1, a snowmobile indicated generally at 16 is anchored to the platform 18 of trailer 10 by means of an anchoring device indicated generally at 20. A second similar anchoring device is shown in the inoperative position at 22.

As previously noted, while not limited thereto in its utility, the present invention is particularly well suited for use in the anchoring of equipment such as snowmobiles, all-terrain vehicles and the like to the platform of a trailer used to transport such vehicles over the highways to utilization sites where they are off-loaded. Most vehicles sold to sportsmen, such as snowmobiles, are provided with a towing flap which may be used for the pulling of trailers, skiers, etc., either via direct connection or by means of rope or cable. These towing flaps are in the nature of either an apertured extension welded or bolted to the rear end of the vehicle or an apertured tab pivotally mounted from the vehicle. Referring to FIGS. 3 and 4, a towing flap is indicated at 24 and is provided with an aperture 26.

Referring now to FIGS. 2-4, the anchoring device of the present invention comprises hinge means having a base member 28 and a plate 30 pivotally mounted with respect to base 28 by means of a hinge or pivot connection indicated generally at 31. The base member 28 is provided with a plurality of holes, such as holes 32 of FIG. 3, through which anchor bolts 34 may be inserted. Bolts 34 will pass through holes 32 and the platform 18 of trailer 10. The base member 28 will be secured to the platform by means which engage the threaded ends of bolts 34 beneath platform 18. Depending upon the weight of the load to be anchored, the securing may be accomplished through the use of nuts and washers. However, in the interest of enhancing the strength of the assembly and preventing damage to the trailer platform, it is usually deemed desirable to employ a backing plate such as plate 36 of FIG. 3. Plate 36 may be provided with threaded sockets as shown for receiving the ends of bolts 34 and/or the bolts may pass through apertures in backing plate 36 and be locked in position with nuts and lock washers beneath the backing plate.

While the invention may be machined from bar stock, in the interest of manufacturing economies at least pivotable plate 30 will typically be stamped in such a manner as to provide the rolled over edges and longitudinal reinforcing rib 37 as shown in FIG. 3. Plate 30 will be provided with a series of slots 40, 40' and 40'' at spaced locations adjacent the free end thereof. The slots 40 are of suitable size and shape to permit insertion of the aforementioned towing flaps therethrough. In addition, as may best be seen from a joint consideration of FIGS. 2, 3 and 6, plate 30 is stamped so as to provide a series of alternately directed corrugations which cooperate to define a longitudinal bore or channel which extends from the free end of plate 30 and intersects each of the slots 40. Plate 30 is also provided with a window intermediate the slot 40'' and the free end of the plate.

A locking pin 46 is inserted in the longitudinal bore in member 30 and is loaded by means of spring 48 to the position where it intersects one or more of slots 40. Spring 48 is mounted on pin 46 and positioned within the window 48 as shown in FIGS. 2 and 3; the spring being compressed between the side of window 44 positioned towards the free end of plate 30 and a projection 50 extending from pin 46. It is to be noted that, in the embodiment disclosed, pin 46 will only intersect slot 40'' when in the operative or load engaging position. While it is possible to provide a pin 46 of sufficient length to intersect more than a single slot, it is deemed preferable to use replacement pins with the length of the pin being dictated by the location of the flap on the load.

The bottom end of plate 30, considering the operative position, is rolled over to form a hinge loop 52 as shown in FIG. 5. Hinge 52 is engaged by a hinge pin 54 suitably mounted in a cut-out formed in the edge of base 28.

In use, the anchoring device of the present invention will initially be in the position represented by device 22 of FIG. 1. In this position the pivotal member 30 lies flat against the platform 18 of the trailer 10 and does not interfere with loading and unloading of snowmobile 16 or any other load which may be secured by the invention. When the snowmobile or other load has been driven or otherwise positioned in platform 18, member 30 is pivoted to the position shown in FIGS. 3 and 4 and an apertured flap 24 extending from the load will be engaged by one of slots 40 in member 30. At the time of engagement the pin 46 will have been retracted by drawing the pin upwardly thus compressing spring 48. When the flap is inserted in the slot, the aperture 26 will be aligned with the longitudinal bore which intersects the slot and the pin will be released so as to pass through aperture 26 thus locking the load in position as shown in FIG. 4.

As will now be obvious to those skilled in the art, a secure and positive means for anchoring a load to a platform is provided by the present invention. The invention is characterized by simplicity and ease of operation. In addition, the invention may be applied to existing trailers and may easily be installed and moved to new positions as dictated by the load since the positioning of the anchoring device is critical to balancing the trailer as is necessary when towing.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for anchoring a load to a platform, the load being provided with an apertured mounting bracket, the anchoring apparatus comprising:
   base plate means;
   means for affixing said base plate means to a platform;
   load engaging means pivotally attached to said base plate means, said load engaging means having at least a first opening therein, said opening being adapted to receive the mounting bracket on the load, said load engaging means further being provided with a bore which intersects said opening; and
   pin means received in said bore, said pin means including a shaft commensurate in size with the aperture in the mounting bracket on the load whereby said shaft may be caused to engage the aperture by manipulation of said pin means when said load engaging means has been pivoted to a use position with the mounting bracket received in said opening provided therefore.

2. The apparatus of claim 1 wherein said pin means comprises:
   a shaft received in said load engaging means bore; and
   spring means urging said shaft in the load engaging direction whereby said shaft normally bridges said opening in said load engaging means.

3. The apparatus of claim 1 wherein said load engaging means comprises:
   elongated arm means defining said opening and said bore; and
   hinge means mounting a first end of said arm means to said base plate means, said hinge means including a hinge pin received in said base plate means.

4. The apparatus of claim 3 wherein said opening is oriented generally parallel with said hinge pin wherein said bore is oriented transversely to said opening.

5. The apparatus of claim 4 wherein said arm means further includes:
   a window in said arm means, said window being located between the second end thereof and said opening, said bore intersecting said window.

6. The apparatus of claim 5 wherein said pin means comprises:
   a locking pin having a shaft received in said bore and a head, said shaft being provided with a projection intermediate its length;

a spring mounted on said shaft between said projection and said head, said spring being disposed within said load engaging means arm window and cooperating with said projection and the top of said window whereby said pin means is urged in the direction where said pin shaft normally bridges said opening.

7. The apparatus of claim 1 wherein said means for affixing said base plate means to a platform comprises:
a plurality of apertures in said base plate means;
fastener means extending through said apertures and the platform; and
backing plate means located beneath the platform.

8. The apparatus of claim 6 wherein said means for affixing said base plate means to a platform comprises:
a plurality of apertures in said base plate means;
fastener means extending through said apertures and the platform; and
backing plate means located beneath the platform.

9. The apparatus of claim 2 wherein said load engaging means comprises:
a longitudinally extending arm of generally rectangular shape, said arm having an integral hinge formed on the first end thereof, said arm further having a plurality of openings formed therein, said bore intersecting all of said openings whereby said load engaging means may be connected to mounting brackets located at different elevations.

10. The apparatus of claim 9 wherein said bore is defined by a series of alternately directed corrugations which cooperate to define a longitudinal channel extending inwardly from the second end of said arm.

11. The apparatus of claim 3 wherein said bore is defined by a series of alternately directed corrugations which cooperate to define a longitudinal channel extending inwardly from the second end of said arm.

12. The apparatus of claim 8 wherein said bore is defined by a series of alternately directed corrugations which cooperate to define a longitudinal channel extending inwardly from the second end of said arm.

13. The apparatus of claim 6 wherein said elongated arm means is in the form of a longitudinally extending plate of generally rectangular shape, said hinge means being formed integrally with said longitudinal plate and at the first end thereof, said arm means further comprising:
a plurality of additional openings formed in said longitudinal plate, said bore intersecting all of the openings whereby said load engaging means may be connected to mounting brackets located at different locations.

14. The apparatus of claim 13 wherein said bore is defined by a series of alternately directed corrugations which cooperate to define the longitudinal channel extending inwardly from the second end of said longitudinal plate.

* * * * *